United States Patent Office 3,829,340
Patented Aug. 13, 1974

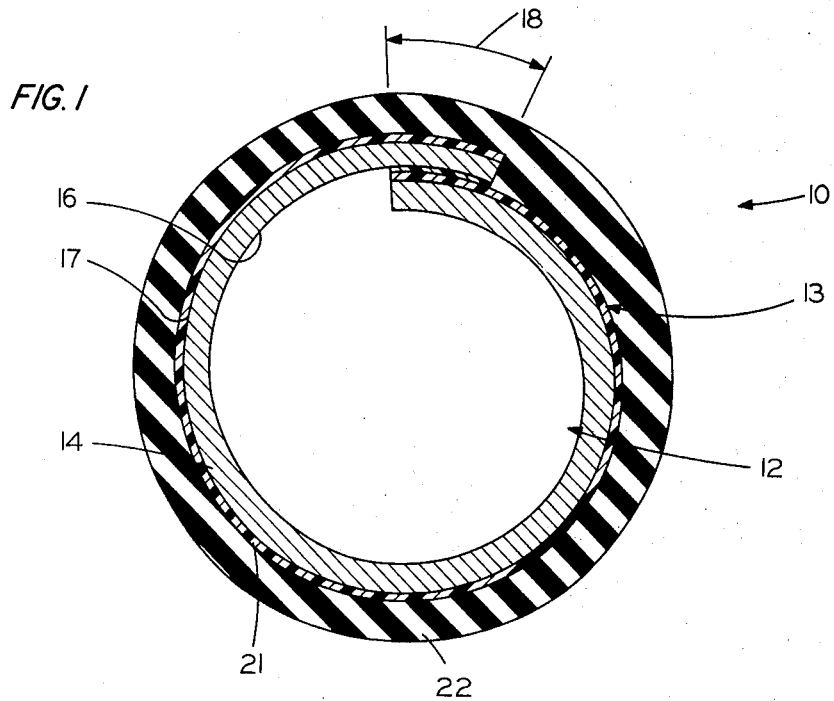
FIG. 1
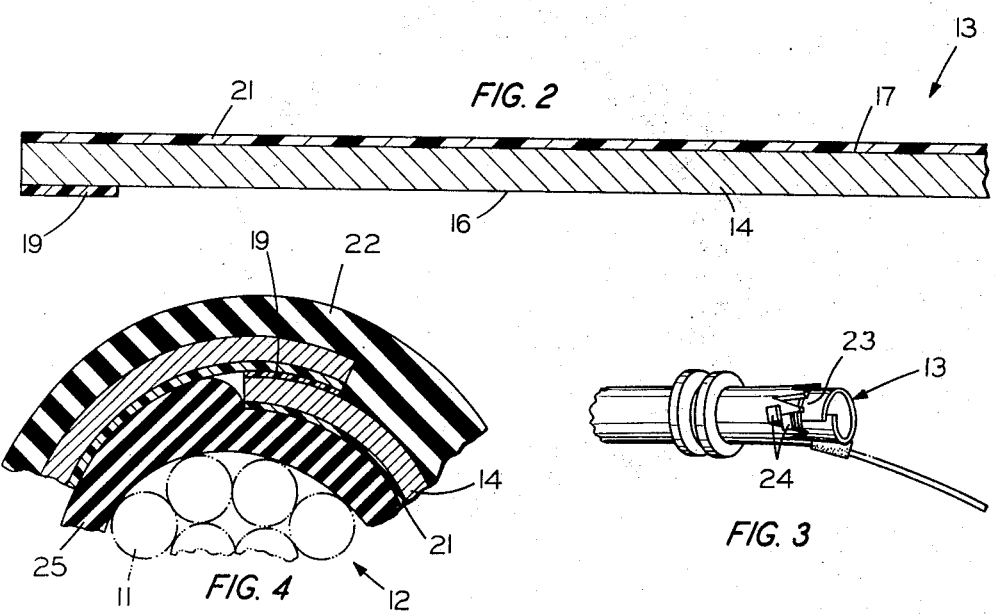
FIG. 2
FIG. 3
FIG. 4
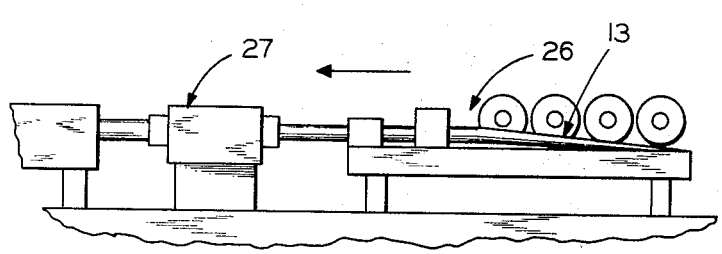
FIG. 5

3,829,340
METHODS OF MAKING A TUBULAR MEMBER HAVING A SEALED LONGITUDINAL SEAM
Matthew R. Dembiak, Clifton, N.J., and George H. Webster, Timonium, Md.; said Dembiak assignor to Western Electric Company, Incorporated, New York, N.Y., and said Webster assignor to Bell Telephone Laboratories, Incorporated, Murray Hill, N.J.
Application Mar. 17, 1971, Ser. No. 125,362, now Patent No. 3,703,605, which is a continuation of abandoned application Ser. No. 809,589, Mar. 24, 1969. Divided and this application Aug. 2, 1972, Ser. No. 277,188
Int. Cl. B29d 23/10
U.S. Cl. 156—201
10 Claims

ABSTRACT OF THE DISCLOSURE

Successive portions of an aluminum tape having one major surface thereof coated with an adhesive copolymer across the entire transverse width thereof and the other major surface precoated with a stripe of adhesive material along an edge portion are folded longitudinally as the successive sections of the tape are being advanced along a predetermined path to form an overlapped seam so that the adhesive copolymer on an edge portion of the one major surface of the tape overlaps the stripe. Subsequently, the adhesive materials on the major surfaces along the overlapped seam develop an adhesive bond by the application of heat and pressure prior to or during the extrusion of a plastic jacket over the tape. The adhesive material on the other, now inwardly facing, major surface is substantially restricted in location and is adhesively bonded to the portion of the inwardly facing major surface of the tape which forms the overlapped seam with a portion of the one, now outwardly facing, major surface. The remaining portion of the inwardly facing major surface of the aluminum tape is bare and the resulting tubular member may be used in a variety of ways.

CROSS REFERENCE TO RELATED APPLICATIONS

This appliction is a division of Ser. No. 125,362, now U.S. Pat. 3,703,605, which is a continuing application of applicants' copending application Ser. No. 809,589 filed Mar. 24, 1969 now abandoned.

BACKGROUND OF THE INVENTION

1. Field of the Invention

This invention relates to methods of making a tubular member having a sealed longitudinal seam, and more particularly, to methods of making a tubular member in which successive portions of a metallic tape are precoated on at least part of one major surface with an adhesive copolymer material and along an edge portion on the other major surface with a stripe of adhesive material and then wrapped longitudinally to form an overlapped seam with an adhesive bond occurring between the adhesive materials on the overlapped portions of the tape.

2. Technical Considerations and the Prior Art

It is known that changes in the ambient conditions lead to differences in vapor pressure between the inside and the outside of a plastic covered tubular member which generally operates to diffuse moisture in a unidirectional manner from the outside of the tubular member to the inside thereof. This eventually will lead to an undesirably high moisture level inside the tubular member, especially if a polyethylene jacket is the only barrier to the ingress of the moisture high.

A metallic laminate which is wrapped longitudinally to form a tubular member is an effective barrier against diffusion of moisture into the core.

The laminate may be made from a single strip of metal, such as aluminum, in the form of a tape, which is wrapped longitudinally about the cable to overlap the edge portions. After the metallic tape of, say aluminum, is folded about the core to form a tube, an outer jacket of polyethylene may be extruded over the tube depending on the requirements of the final product. As the polyethylene cools, the polyethylene material contracts. The cooling proceeds from the outer surface of the jacket inwardly with the shrinkage forcing the polyethylene into close engagement with the surface of the longitudinally folded tape and slides the overlapping edge portions of the metallic tape relative to each other to partially collapse the shield. The relative sliding movement of the overlapping edge portions is stopped when the tubular shield is supported against the core. During this shrinkage, the outer overlapping edge of the folded tape presses outwardly into the plastic jacket, thereupon reducing the effective jacket thickness radially outward from the tape edge.

The slippage along the seam may be eliminated and the effectiveness of the strip as a moisture barrier or shield enhanced substantially if the seam between the overlapping edges is sealed. More particularly, a seal is most effective in which a metal-to-metal bond of the overlapping edge portions is accomplished, for example, by welding or soldering. Generally though, the materials which may be the core are temperature-sensitive and easily damaged if overheated. These characteristics render the use of welding, as a sealing technique, impractical because of the high temperature involved in most ordinary welding processes. Moreover, the aluminum, because of its highly reactive nature, generally maintains an oxide film which vitally precludes continuous soldering as a joining technique. Therefore, other methods have been devised for sealing the overlapping edges of the seam of the aluminum, longitudinally wrapped, laminate.

In order to improve the corrosion resistance of the laminate and eliminate the slippage along the overlapping seam, a special adhesive copolymer consisting essentially of a polyethylene in form with attached carboxyl groups may be applied both sides of the metallic tape. The adhesive copolymer which is an ethylene acid copolymer or more partticularly, an ethylene acrylic acid copolymer, is applied in the form of a flexible protective film and has high electrical resistivity, high resistance to chemicals and moisture, and especially good adhesion to the aluminum to withstand both manufacturing processes, such as corrupgating and longitudinal folding, and to prevent delaminations in corrosive environments. The application of adhesive copolymers in laminates is discussed by B. Wargotz in an article "Environmental Stability of Ethylene-Acrylic Acid Adhesive Copolymers Bonded to Metal Substrates" published in Vol. 12 of the Journal of Applied Polymer Science, pages 1873–1888 (1968). Adhesive copolymers such as these develop a firm bond between the metallic strip and the outer polyethylene jacket.

Adhesively sealed metallic moisture barriers may be manufactured without resort to an overlapped seam. Metal tapes, for example, have been formed into "finned" configurations wherein the two edge portions of a longitudinally applied tape are oriented radially of a cable core with the polymer coatings on the inner surfaces of each of these edge portions being in contact. The two edge portions are then heated and pressed to form a bond between the two copolymer coatings. The projecting sealed "fin" is then folded down to lie substantially parallel to the main portion of the formed tape. The sealing of the "fin" is sometimes accomplished by the heat of a polymeric jacket extruded over the metal tape rather than in a separate sealing operation.

The use of this "finned" seam system results in at least three thicknesses of materials along some part of the periphery of the metal tape and these multiple thicknesses of material add to the non-uniformity in the thickness of a polymeric jacket applied over the metal tape. The forming and sealing of the "fin" type seam is much more difficult than forming an overlap seam.

A metallic, for example, aluminum tape, may be precoated on both major surfaces with the adhesive copolymer, across the entire width thereof, after which the precoated tape is folded longitudinally about the core. When a polyethylene jacket is applied over the core and metallic shielding layer, the heat from the semimolten polyethylene extruded around the shielding layer bonds the metal strip to the polyethylene jacket. If the heat imparted to the polyethylene material is sufficiently high, the aluminum tape will become hot enough so that bonding will also occur between overlapped layers of the shielding layer at the seam. The coated metallic tape firmly adheres to the outer jacket to further inhibit the penetration of moisture. The use of a shielding layer with a sealed seam also has been shown to have higher strength characteristics necessary to withstand repetitious bending of the cable.

Although the desired bond between the outer jacket and the core and the prevention of moisture penetration is solved by the use of a fully bonded sheath such as that described above, problems arise in some uses. For example, it may be required that the polyethylene jacket be removed from the aluminum tape or that a clamp be placed in contact with the inner surface of the metallic tape. An ear is formed at each end of the sheath clamp which protrudes through slots cut in the metallic tape and are exposed for engagement with a grounding clamp. Because of the intimate bond between the metallic tape and the jacket and between the metallic tape and the copolymer coating, it is difficult to bare the metallic tape to develop, say, electrical contact at the splice location to assure that the shielding function of the aluminum tape takes place.

Of course, the tubular member could be manufactured with something less than an intimate bond between the jacket and the laminate to facilitate splicing and grounding while still providing corrosion protection for the metal tape. In at least one prior art patent, firm adhesion of the adhesive copolymer is restricted to only a portion of the interface between the jacket and the laminate. More specifically, the metallic tape is coated with a reactive carboxyl group material only along the longitudinal edge portions and for a limited predetermined distance on each side of the tape from the edges. The remainder of the tape is coated with a material having less adhesive qualities or may be coated with the same material over the entire width and then treated along a portion thereof intermediate the edges to reduce the adhesive characteristics of the coating in the portion intermediate the edges. (See U.S. Pat. 3,379,821 issued Apr. 23, 1968.)

However, any reduction in adhesive at the interface will be matched by a corresponding reduction in the absolute resistance to moisture penetration. In the construction just described, protection against moisture penetration depends upon a sealed seam. The absence of an intimate bond between the jacket and the laminate around the majority of the periphery of the tubular member presents the possibility of moisture penetration through pin holes with subsequent travel of the moisture along the length of the tubular member between the jacket and the laminate.

In many types of cable seam constructions, the sealing of the overlap depends upon the development of an adhesive bond between an adhesive, say precoated on one of the overlapping metallic portions to the other uncoated metallic portion, or say the development of an adhesive bond of an adhesive tape to both metallic overlapping portions of the metallic shield.

It is therefore an object of this invention to provide methods of manufacturing tubular members having a metallic laminate with an overlapped seam sealed with the requisite integrity by developing an adhesive bond between two adjacent contiguous adhesive materials at the overlapped seam and having portions of the laminate bare for splicing purposes.

Of course, it is possible to merely coat one major surface of the aluminum strip with the adhesive copolymer. However, there would then be no adhesive on the other major surface to bond with the adhesive on the one major surface along the overlapped edge portions at the seam to form the desired sealed seam. In order to obtain a reliably sealed seam, the other major surface of the aluminum strip is preferably coated at least along the edge portion thereof with an adhesive material.

However, methods have not priorly been developed in which only a portion of one major surface is coated with adhesive copolymer material. This was due in part to the fact that if a plurality of strips of adhesive copolymer material were extruded on a web of aluminum, for example, and then wound on a take-up reel, the resulting roll, having an enlarged diameter alternating with voids across the transverse width of the roll because of the buildup of strips, would be exceedingly difficult to handle and slit.

Therefore, it is an object of this invention to provide a tubular member in which one major surface of a metallic tape is precoated across the entire transverse width thereof with a first adhesive copolymer material and the other major surface has a stripe of a second adhesive material selectively applied on the tape to bond with the first adhesive material on the one major surface.

The term "facing" as employed in this specification and claims appended thereto when referring to the relationship between a surface and an object will be understood to mean that the surface is oriented in the direction of the object and may be, but is not necessarily, adjacent to or in contact with the object.

The term "major surface" as employed in this specification and appended claims when referring to surfaces of a strip of material or tape should be understood to include the large faces of the strip and not the edges of the strip even though the faces might have curved, corrugated or otherwise nonplanar configurations and even though the edges might blend smoothly into the faces without any sharp geometrical definition.

The term "polymeric" material as employed in this specification and appended claims will be understood to include both thermoplastic compounds such as polyethylene and polyvinyl chloride or the like, thermosetting compounds such as epoxies and polyurethanes and elastomers such as neoprenes.

SUMMARY OF THE INVENTION

A method of manufacturing a tubular member and illustrating certain features of the invention may include the steps of advancing successive sections of at least one longitudinal tape along a predetermined path, forming successive portions of the tape into a tubular shape with at least one overlapped seam and such that the radius of curvature of the tape is substantially equal to the radius of curvature of the tubular shape, the tape having adhesive material precoated on at least part of an edge portion of one of the major surfaces of the tape forming the overlapping seam, the tape also having adhesive material precoated on at least part of the other major surface of the tape along an edge portion thereof with the adhesive material on the other major surface being at least adhesively bonded to the portion of the other major surface of the tape which forms the overlapped seam with a portion of the one major surface, the remaining portion of the other major surface of the tape being at least partially bare, the adhesive materials on the major surfaces capable of developing an adhesive bond along the overlapped seam at a predetermined temperature to seal the seam, and applying heat to successive portions of the overlapped seam to elevate the temperature to the temperature at which the adhesive bond occurs.

Additional advantages and features of the invention will be better comprehended by reference to the drawing and the detailed descriptions which follow.

BRIEF DESCRIPTION OF THE DRAWING

FIG. 1 is a cross-sectional view of a tubular member taken transverse to a longitudinal axis of the tubular member with a laminate, which includes a metallic tape, wrapped longitudinally with an overlapped seam, to bond an adhesive material on an outwardly facing major surface of the tape to a stripe of adhesive material on an inwardly facing major surface and in some applications having a jacket extruded thereover;

FIG. 2 is a cross-sectional view of the metallic tape taken transverse to a longitudinal axis of the tape and showing an adhesive material coated over the full transverse width of one major surface of the tape and a stripe of adhesive material on the other major surface adjacent a longitudinal edge thereof;

FIG. 3 is a view showing the tubular member at a splice location with a portion of the laminate and jacket cut away from the core to permit insertion of a grounding ring at the splice location;

FIG. 4 is a sectional view of a tubular member taken transverse to the longitudinal axis of the tubular member manufactured in accordance with the principles of the method of this invention with a laminate having a sealed longitudinal seam and having provisions for grounding an outwardly facing major surface of the laminate; and FIG. 5 is a simplified view of an apparatus for carrying out the steps of the method which embodies the principles of this invention to fold successive portions of the metallic tape, precoated across the full width of one major surface with a first adhesive material and having a stripe of a second adhesive material adjacent a longitudinal edge on the other major surface.

DETAILED DESCRIPTION

Referring now to FIG. 1, there is shown a tubular member designated generally by the numeral 10, and having a hollow core 12. The core 12 is coextensive with the tubular member 10. The core 12 may include one or a plurality of conductors 11—11 (see FIG. 4).

Accordingly, to protect the core 12, a laminate, designated generally by the numeral 13 (see FIG. 2), is wrapped longitudinally (see FIG. 1). As is shown in FIG. 2, the laminate 13 includes a metallic tape 14. The laminate 13, prevents the diffusion of water vapor interior of the tubular member 10.

The metallic tape 14 surrounds the core 12 with inwardly and outwardly facing major surfaces 16 and 17, respectively (see FIG. 2), of the tape in overlapped relation with each other along longitudinal edge portions thereof to form a seam 18 (see FIG. 1). The radius of curvature of the metallic tape 14 which surrounds the core 12 is substantially equal to the radius of curvature of the core. In the one type of construction shown in FIG. 1, which embodies the principles of this invention, the major surface 16 of the tape 14 faces inwardly toward the core 12, while the major surface 17 faces outwardly in order to overcome the problems discussed hereinbefore, the longitudinal seam 18 must preferably be sealed while simultaneously making provisions for grounding the metallic tape 14 at splicing locations.

The major surfaces 16 and 17 of the aluminum tape 14 are selectively coated with adhesive materials at least along the portions theerof which form the overlapped seam prior to assembly with the core 12, so that the adhesive on the inwardly facing major surface 16 bonds with the overlapped portions thereof while simultaneously providing a structure which exposes the inwardly facing major surface 16 of the laminate 13 adjacent the core 12 (see FIG. 1). By developing a bond of adhesive material with adhesive material, a more reliably sealed seam 18 is obtained than by using methods which attempt to develop an adhesive-to-metal bond during the forming of the overlapped seam.

A stripe 19 of an adhesive copolymer material is applied longitudinally onto the inwardly facing major surface 16 of the aluminum tape 14 along a peripheral edge portion thereof (see FIG. 2). Additionally, an adhesive copolymer material is applied on the outwardly facing major surface 17 of the metallic tape 14 across the entire transverse width thereof to form a film 21 (see FIG. 2). In this way, the peripheral edge portion of the adhesive film 21 on the outwardly facing major surface 17 is in engagement with and develops an adhesive bond with the stripe 19 on the peripheral edge portion of the inwardly facing major surface 16 of the tape 14 to seal the overlapping surfaces along the seam 18 (see FIG. 1).

The film 21 on the outwardly facing major surface 17 is an adhesive material which has the ability to develop firm adhesion to the metallic tape 14, and is highly resistant to corrosion and inhibits penetration of moisture into the core. Moreover, the adhesive material develops a firm bond with an overlying polyethylene jacket 22 (see FIG. 1), which is extruded over the laminate 13. The adhesive materials which comprise the film 21 and the stripe 19 are selected so that when the laminate 13 is wrapped around the core 12, the film and the stripe, under the application of heat, to raise the temperature to a predetermined temperature above ambient temperature, and pressure, are caused to develop a bond to seal the seam 18.

The materials of the stripe 19 and the film 21 on the inwardly and outwardly facing major surfaces 16 and 17, respectively, are comprised of ethylene acid copolymers. Although the materials of the stripe 19 and the film 21 may be adhesive copolymers having the same composition, the composition of the stripe is determined by the method used to form the stripe of a required thickness on the inwardly facing surface of the tape 14. For example, the film 21 is generally extruded over the outwardly facing major surface 17; if the stripe 19 could be extrusion-coated onto the major surface 17, the composition of the material in the stripe could be of the same composition as that in the film.

However, difficulties are encountered in attempting to extrude with a thin stripe of the desired dimension. In order to avoid the difficulties of slitting due to build-up on successive layers of a wound roll of laminate 13, it may be desirous that the thickness of the stripe 19 is substantially less than the thickness of the film 21 on the laminate 13.

Therefore, a copolymer solution may be used and the stripe 19 is painted, rolled or printed by conventional coating techniques on the major surface 17. Accordingly, the melt index and the acrylic acid content of the material of which the stripe 19 is comprised must be substantially greater than the melt index and the acrylic acid content of the material of which the film 21 is comprised. The acrylic acid content and the melt index of the copolymer must be adjusted, e.g., 15–20 percent acrylic acid content, 100–200 melt index, so as to easily disperse the copolymer into solution.

Both the material for the stripe 19 and the material for the film 21 are available from commercial sources. For example, the film 21 may be composed of an ethylene acrylic acid copolymer such as that marketed by Dow Chemical Company of Midland, Mich. under the designation QX2375.0. Some examples of the copolymers for striping which are marketed are those of Union Carbide Company, under the designation EAA resin 9500, and by E. I. du Pont de Nemours and Company under the trademark Surlyn D dispersions.

Because of the properties of the QX2375 it is difficult to put the material into acqueous solution to get the required thickness of stripe. The QX2375 material has a melt index of approximately 5.0 and an acrylic acid content of 6–8 percent by weight. If the acrylic acid content were much higher, the adhesive would not bond to the jacket; if lower, the adhesive bonds better to the jacket, but then there is difficulty in bonding to the aluminum tape. The 6–8 percent acrylic acid content is therefore a compromise.

To achieve the thin stripe 19 required, e.g., 1/3 to 1/2 mil, the copolymer material of the stripe must be tailored to easily disperse into solution. The EAA 9500 has a melt index of 150–200 and an acrylic acid content of 20 percent. The acrylic acid content is high to compensate for the higher melt index and hence the weaker polymer. The acrylic acid content serves as a hardening agent, and acts as a gripping agent as between the aluminum tape 14 and the resin to give the requisite bond strength. If the acrylic acid content were to be reduced, the bond strength between the aluminum and the adhesive or between the adhesive materials will be reduced accordingly.

The EAA resin 9500 and the Surlyn D materials are both generic to salts of acrylic acid, the EAA 9500 being an ammonium salt, and the Surlyn D being an alkaline metal salt. During the striping and curing process, the EAA 9500 is treated with ammonium to make an ammonia solution, the ammonia driven off from the EAA 9500 striping solution before driving off the water with an ethylene acrylic acid stripe 12 resulting which has properties different from those of the material of the film 21, e.g., the melt index and the acrylic acid content. But by using the Surlyn D dispersion, a salt is generated, as opposed to the acid of the EAA 9500, with the result that the stripe is composed of an acid and a complex salt. The Surlyn D may be treated with sodium hydroxide or zinc salt to make an alkali metal salt.

A solution of these copolymers may be effected by dispersing an acid copolymer in either an organic solvent or in water.

Generally, the stripe 19 is applied from a solution which is obtained by dispersing a high melt index ethylene acrylic acid copolymer of greater than fifteen percent by weight acrylic acid in water which contains ammonium hydroxide. A salt of ethylene acrylic acid is formed which is coated onto the aluminum and dried.

Also, generally the material of the film 21 is selected so as to have a lower melting point than the material of the stripe 19. In this way, heat transfer takes place through the stripe 19 so that the film 21 contiguous with the stripe along the seam 18 melts and bonds to the stripe to seal the seam.

The physical size of the overlapping seam 18 is an important factor in the ability of the laminate 13 to prevent diffusion of water into the tubular member 10. The rate at which water vapor diffuses through a material is proportional to the area which is exposed to the source of water vapor and the rate of diffusion is increasingly inversely proportional to the length of the path through which the water vapor must travel. It should be apparent that as the overlapped seam 18 of the laminate 13 is increased in width and as the thickness of the adhesive seal in the seam decreases, the ability of the adhesive seal to prevent moisture diffusion is increased. As a practical matter, it becomes necessary to assign definite dimensions to the seal. Cost and manufactuirng considerations are factors which have led to a determination of optimum dimensions for the adhesive seal.

By applying a stripe 19 of adhesive material along an edge portion of the aluminum tape 14 along the inwardly facing major surfaces 16 thereof, and then coating the entire outwardly facing major surface 17 with the adhesive copolymer film 21, the mating major surfaces 16 and 17, along the overlapped edges, form the sealed seam 18 and a moisture resistant tubular shield is formed around the core 12. The resistance of the tubular member 10 against the penetration of moisture is further improved by applying the polyethylene jacket 22 to the outwardly facing major surface of the adhesive copolymer film 21 under extruding temperatures which are designed to yield optimum bonding of the polyethylene to the laminate 13.

Moreover, the sealed seam 18 along the overlapping edges of the laminate 13 produces a tubular member having improved strength characteristics which gives prolonged useful life although subjected to repeated bending.

The construction of the tubular member 10 in accordance with the principles of this invention gives a reliably sealed seam 18. During the forming of the temperature laminate 13 to surround the core 12, various lubricants are used in the equipment. If one of the major surfaces were bare, the lubricants may contaminate the surface of the portion thereof that bonds with an adjacent contiguous portion of the other major surface. This contamination detracts from the development of a reliable adhesive bond between the adhesive on the one major surface to the bared other surface. By using a stripe 19 so as to obtain an adhesive-to-adhesive bond, as opposed to adhesive-to-metal, at the overlap, this problem is overcome. Moreover, at line speeds now in use, it is difficult to obtain a reliably sealed adhesive-to-metal seam.

The construction of the cable 10 in accordance with this invention also facilitates the grounding of the tube at a splice location. For example, during installation and at a splicing location, the jacket 22 and laminate 13 may be slit and pulled away from the core 12 as shown in FIG. 3. Then an installer inserts a grounding ring 23 having ears 24 under and in electrical engagement with the bared portion of the inwardly facing major surface 16 of the tape 14.

Other types of tube construction which embody the principles of this invention, may require that the outwardly facing major surface 17 of the laminate 13 be barred. Referring now to FIG. 4, construction includes conductors 11 and an inner polyethylene jacket 25 which encloses the conductors. The adhesive copolymer film 21 is coated across the entire width of the inwardly facing major surface 16 with the stripe 19 applied along one longitudinal edge of the outwardly facing major surface 17. In this way, the major surface 16 may be bonded intimately to the material of the core 12 while the jacket 22 is extruded over and in direct contact with the major surface 17.

METHOD OF MAKING

In the method of making a tubular member 10 which embodies the principles of the present invention, aluminum sheet stock may have a film 21 of ethylene acrylic acid copolymer precoated across one major surface 17 thereof. The adhesive material in the film 21 has the ability to develop an adhesive bond at a predetermined temperature above ambient temperature. The precoated aluminum is taken up in a roll (not shown) and slit into tape-size widths, each of the tapes 14 having one major surface 17 precoated with a film 21 of ethylene acrylic acid polymer.

An aluminum tape 14 precoated across the entire width of one major surface 17 thereof, with a first adhesive copolymer material, is available commercially such as, for example, from the Dow Chemical Company under the designation Zetabond. A stripe 19 of a second adhesive ethylene acrylic acid copolymer is applied from a solution and precoated along a longitudinal edge portion of the other major surface 16 thereof which is to form the overlapped seam 18 with a portion of the outwardly facing major surface. Then successive portions of the tape 14 are advanced into a tube forming device, designated generally by the numeral 26 (see FIG. 5).

Referring now to FIG. 5, the metallic tape 14 is wrapped longitudinally by the tube forming device 26 to enclose the core and to form the overlapping seam 18 between the inwardly facing major surface 16 of the stripe and the outwardly facing major surface 17 thereof. As can be seen in FIG. 1, the tape 14 is wrapped about so that the radius of curvature of the tape is substantially equal to the radius of curvature of the core. Then the enclosed core 12 is advanced to, and through, a conventional plastic extruder, designated generally by the numeral 27, which is used to extrude the circumferential jacket 22 of polyethylene over the metallic tape 14 of the laminate 13. This raises the temperature to the predetermined temperature and causes an adhesive bond to be developed between the adhesive materials on the overlapping portions of the opposite surfaces of the tape.

Molten polyethylene may be fed from the extruder 27 at a temperaturue of from 357° F. to 475° F. It is more desirable to restrict the temperature range to one of 25° F. between 425° F. and 450° F. There is sufficient heat within the polyethylene so that the heat transfer takes place through the coplymer film 21 contiguous the jacket 22 through the metallic tape 14 and the stripe 19 to melt the portion of the film in the seam 18 to bond to the stripe. Simultaneously, the film 21 contiguous the jacket 22 is caused to develop an adhesive bond with the jacket to achieve a fully bonded sheath.

After the polyethylene jacket 22 has been extruded over the laminate 13, provisions must be made to prevent an excessive amount of heat flowing from the hot plastic jacketing material inwardly toward the core. This sometimes damaging heat flow is accomplished by rapidly chilling the plastic jacket 22, with any of several apparatus (not shown) well known in the art.

Alternately, the overlapped bonded seam 18 may be formed independently of the extrusion of the jacket 22. Successive portions of the metallic tape 14, precoated with the stripe 19 and film 21 on the major surfaces 16 and 17, respectively, are drawn into an induction-heating unit (not shown) similar to those units disclosed in U.S. Pats. 2,758,189, 2,801,316 and 2,925,485 which issued on Aug. 7, 1956, July 30, 1957 and Feb. 16, 1960, respectively, to D. A. Hughes. Other types of apparatus which employ flame heating or hot air may be used to apply heat to successive portions of the seam 18.

As the metal covered core unit 12 is passed through the induction-heating unit (not shown), high frequency magnetic fields develop currents within the seam portion of the laminate 13, to heat the seam. By properly controlling the power with conventional control means (not shown), sufficient heating may be provided to accomplish bonding in the seam portion without degradation of the copolymer. A water-quenching station (not shown) may be located immediately adjacent the exit end of the induction-heating unit (not shown) to spray water at ambient temperature onto the seam portion to cool the seam while maintaining pressure therein. Any moisture on the laminate 13 is removed to prepare the now enclosed core 12 for a jacketing operation.

After the metallic tape 14 is formed into a tubular shape with a bonded overlapped seam 18, the subassembled unit may subsequently have a polyethylene jacket 22 applied to the outwardly facing major surface of the copolymer film 21. One of the advantages in using the two step operation of heating and later jacketing is that the integrity of the sealed seam 18 can be checked before the polyethylene jacket 22 is applied. Various techniques can be used to check the integrity of the adhesive seal. One technique is described in U.S. Pat. 2,988,917 issued on June 20, 1961 to C. A. Hallam et al.

The use of a forming, sealing and seam integrity checking system, independent of a jacket extrusion operation, allows for starts and stops to make repairs without impairing the extrusion operation. If circumstances were to make it unimportant to be able to start and stop the forming and sealing operation, the application of the jacket 22 could be accomplished in a tandem operation without intermediate reeling of the core unit 12. A conventional device (not shown) for checking the integrity of the adhesive seal could be used in a scheme wherein faulty areas were marked so that they could be repaired or cut out of the tubular member 10 after the jacket 22 has been applied.

The tubular member 10 may also be assembled, employing the principles of the method of this invention, to provide for grounding the outwardly facing (see FIG. 4) major surface 17 of the metallic tape 14. Accordingly, the precoated tape 14, is wrapped about the core 12 to overlap the stripe 19 along a longitudinal peripheral edge portion of the outwardly facing major surface 17 of the tape with the copolymer film 21 on the inwardly facing major surface 16. Then the jacket 22 is extruded over the laminate 13 in intimate contact with the exposed outwardly facing surface 17 of the tape 14.

In one example of a tubular member 10 manufactured in accordance with the principles of this invention, an aluminum tape 14 having a width of from 8½ to 8¾ inches and a thickness of from 6 to 8 mils is precoated with an ethylene acrylic acid copolymer to form a film 21 which has a thickness of approximately 2 mils. Then the precoated tape 14 is coated with a solution of adhesive copolymer having a high acrylic acid content to form a stripe 19 on the major surface 16 of the tape. The stripe 19 has a thickness of ⅓ to ½ mil and has a width of one inch. The barrier laminate including the tape 14 having the stripe 19 and film 21 therein was wrapped longitudinally about an advancing core having a diameter of 2.45 inches. Then a polyethylene jacket 22 was extruded over the shielded core to complete the cable 10.

It would be within the scope of this invention to form a tubular member without an outer or inner jacket from a metallic tape by wrapping successive portions of the tape into a tubular shape having an overlapped seam such that no portions of the tape are retroflexed. The tape is precoated with an adhesive material on at least part of an edge porion of one of the major surfaces of the tape facing the overlapped seam, and precoated with an adhesive material on at least part of the other major surface which forms the overlapped seam wth the one major surface such that the adhesive materials are caused to develop a bond along the overlapped seam. The remaining portion of the other major surface of the tape is at least partially bare.

The tape from which the tubular member is formed could have an adhesive material applied over the entire transverse width of the outwardly facing surface. Of course, in that instance, the adhesive material on the outwardly facing major surface could conceivably act as an insulating barrier to the transfer of heat to the abutting adhesive materials along the overlapped seam. In order to transfer the necessary heat through this potential insulating barrier and achieve a suitable bond along the overlapping seam, it may be necessary to provide an excessive amount of heat or allow the heat transfer to take place over a longer period of time. This latter course of action can only be achieved by decreasing the linear rate at which the elongated member moves through the manufacturing process. A decrease in the feeding or cooling rate causes a decrease in production output or increase in floor space required with accompanying increase in cost of the manufactured product.

Should there be problems in heat transfer to the seam, it would be within the scope of the invention to omit the adhesive material on the outwardly facing major surface, for example, along an edge portion thereof opposite the overlapped seam. Then heat could be applied directly to uncoated successive portions of the metallic tape.

It is to be understood that the term "tubular member" as used in the specification and claims includes not only a cable having a core, but a tape formed into a tubular shape without a core as well as a single conductor having insulation applied thereover.

It is to be understood that the above-described embodiments are simply illustrative of the invention and that many other embodiments can be devised without departing from the scope and spirit of the invention.

What is claimed is:

1. A method of manufacturing a tubular member, which comprises the steps of:

advancing successive sections of at least one longitudinal tape along a predetermined path;

forming successive portions of the tape into a tubular shape with at least one overlapped seam and such that the radius of curvature of the tape is substantially equal to the radius of curvature of the tubular shape, the tape having inwardly and outwardly facing major surfaces, the tape having a first adhesive material precoated on at least part of an edge portion of one of the major surfaces of the tape forming the overlapping seam, the tape also having a second adhesive material precoated on at least part of the other major surface of the tape along an edge portion thereof with the second adhesive material on the other facing major surface being at least adhesively bonded to the portion of the other facing major surface of the tape which forms the overlapped seam with a portion of the one major surface, the remaining portion of the other major surface of the tape being at least partially bare, the first and the second adhesive materials on the major surfaces capable of developing an adhesive bond along the overlapped seam at a predetermined temperature to seal the seam, the adhesive materials consisting essentially of ethylene acrylic acid copolymers with the second adhesive material having a melt index and an acrylic acid content which are substantially greater than the melt index and the acrylic acid content, respectively, of the first adhesive material; and applying heat to successive portions of the overlapped seam to elevate the temperature to the temperature at which the adhesive bond occurs.

2. A method of manufacturing a tubular member, which comprises the steps of:

advancing successive sections of at least one longitudinal tape along a predetermined path;

forming successive portions of the tape into a tubular shape with at least one overlapped seam and such that the radius of curvature of the tape is substantially equal to the radius of curvature of the tubular shape, the tape having a first adhesive material precoated on the outwardly facing major surface of the tape across the entire transverse width thereof, the metallic tape also having a second adhesive material precoated on the inwardly facing major surface of the metallic tape along an edge portion thereof with the adhesive material on the inwardly facing major surface being substantially restricted in location to and being adhesively bonded to the portion of the inwardly facing major surface of the tape which forms the overlapped seam with a portion of the outwardly facing major surface, the remaining portion of the inwardly facing major surface of the tape being bare, the first and the second adhesive materials on the outwardly and inwardly facing major surfaces, respectively, being capable of developing an adhesive bond along the overlapped seam at a predetermined temperature to seal the seam, the adhesive materials consisting essentially of ethylene acrylic acid copolymers with the second adhesive material having a melt index and an acrylic acid content which are substantially greater than the melt index and the acrylic acid content, respectively, of the first adhesive material; and applying heat to successive portions of the overlapped seam to elevate the temperature to the temperature at which the adhesive bond occurs.

3. The process of manufacturing a tubular member of claim 2, wherein heat is applied to successive portions of the overlapped seam by extruding a jacket of polymeric material over the outside of the metallic tape, and permitting the temperature of the portion of the jacket adjacent to the metallic tape to remain at least at the predetermined temperature for at least a predetermined period of time, the combination of the predetermined temperature and the predetermined time being such that a sufficient temperature elevation occurs in the adhesive materials at the overlapped seam so that the adhesive materials develop and bond to each other and such that the adhesive material on the outwardly facing major surface bonds adhesively to the jacket, and wherein the predetermined temperature at which the adhesive bonds occurs is less than the temperature at which the jacket is extruded over the tape.

4. The process of manufacturing a tubular member of claim 2, which also includes the step of:

maintaining a proper positional relationship between the adjacent mating portions of the major surfaces of the metallic tape which face each other at the overlapped seam.

5. The method of claim 2, wherein the thickness of the precoating of first adhesive material is substantially greater in thickness than the precoating of second adhesive material.

6. The method of claim 2, wherein the second adhesive material is capable of being applied in the form of a solution to the metallic tape.

7. The method of claim 6, wherein the copolymer solution is a high melt index ethylene acrylic acid copolymer of greater than 15 percent by weight acrylic acid in water solution which contains ammonium hydroxide.

8. The method of claim 6, wherein the second adhesive material may be precoated onto the tape as a salt solution of an acrylic acid.

9. The method of claim 8, wherein the salt is an ammonium salt.

10. The method of claim 8, wherein the salt is an alkali metal salt.

References Cited

UNITED STATES PATENTS

| | | | |
|---|---|---|---|
| 3,574,016 | 4/1971 | Wahlberg | 156—54 |
| 3,534,149 | 10/1970 | Peacock et al. | 174—105 R |
| 3,507,978 | 4/1970 | Jachimowicz | 174—105 R |
| 3,459,877 | 8/1969 | Bullock et al. | 156—54 |
| 3,332,138 | 7/1967 | Garner | 156—54 |
| 3,424,631 | 1/1969 | Peacock | 156—56 |
| 3,325,589 | 6/1967 | Mildner | 156—54 |
| 3,291,891 | 12/1966 | Sharp | 174—107 |
| 3,274,329 | 9/1966 | Timmons | 174—107 |
| 3,264,272 | 8/1966 | Rees | 117—127 |
| 3,233,036 | 2/1966 | Jachimowicz | 174—107 |
| 3,215,678 | 11/1965 | Adelman | 260—80.5 |
| 3,032,604 | 5/1962 | Timmons | 174—107 |

FOREIGN PATENTS 1,034,730  7/1958  Germany.

CHARLES L. VAN HORN, Primary Examiner

B. J. LEWRIS, Assistant Examiner

U.S. Cl. X.R.

138—151; 156—203, 218, 244, 344